(12) United States Patent
Le Meur et al.

(10) Patent No.: US 10,311,639 B2
(45) Date of Patent: Jun. 4, 2019

(54) METHOD OF DISPLAY AND SYSTEM FOR AIDING NAVIGATION

(71) Applicant: Thales, Courbevoie (FR)

(72) Inventors: Alain Le Meur, Elancourt (FR); Etienne Payot, Elancourt (FR)

(73) Assignee: Thales, Courbevoie (FR)

( * ) Notice: Subject to any disclaimer, the term of this patent is extended or adjusted under 35 U.S.C. 154(b) by 113 days.

(21) Appl. No.: 14/652,137

(22) PCT Filed: Dec. 10, 2013

(86) PCT No.: PCT/EP2013/076042
§ 371 (c)(1),
(2) Date: Jun. 15, 2015

(87) PCT Pub. No.: WO2014/095480
PCT Pub. Date: Jun. 26, 2014

(65) Prior Publication Data
US 2015/0332503 A1 Nov. 19, 2015

(30) Foreign Application Priority Data

Dec. 17, 2012 (FR) .................................... 12 03441

(51) Int. Cl.
*G06T 19/00* (2011.01)
*G02B 27/01* (2006.01)
(Continued)

(52) U.S. Cl.
CPC ............ *G06T 19/006* (2013.01); *G01C 21/00* (2013.01); *G02B 27/017* (2013.01); *G06F 3/011* (2013.01);
(Continued)

(58) Field of Classification Search
CPC .............. G01C 21/00; G02B 27/017; G02B 2027/0138; G06F 3/011; G06T 19/006; G06T 3/4038
See application file for complete search history.

(56) References Cited

U.S. PATENT DOCUMENTS 7,148,861 B2 * 12/2006 Yelton ..................... G06T 15/04
345/8
7,180,476 B1 2/2007 Guell et al.
(Continued)

OTHER PUBLICATIONS

Kijima et al. ("A development of reflex HMD—HMD with time delay compensation capability." Proc. 2nd Int'l Symp. Mixed Reality. 2001).*

(Continued)

*Primary Examiner* — Maria E Vazquez Colon
(74) *Attorney, Agent, or Firm* — Thompson Coburn LLP; Thaddeus J. Blenke

(57) ABSTRACT

The invention relates to a display method for displaying an image on a screen (24) of a headset (16) of a system (12) for aiding navigation, the system (12) for aiding navigation comprising the headset (16), and a calculator (18). The method comprises the successive steps: of measuring the orientation of the headset (16) of the operator furnished with the headset (16); of processing a first image having a first number of pixels so as to obtain a first processed image; of extracting a part of the first processed image as a function of the measured orientation of the headset (16) so as to obtain a second image, the second image having a second number of pixels strictly lower than the first number of pixels; and of dispatching by the calculator (18) to the headset (16) of the second image for display on the screen (24).

9 Claims, 2 Drawing Sheets

Figure 1:
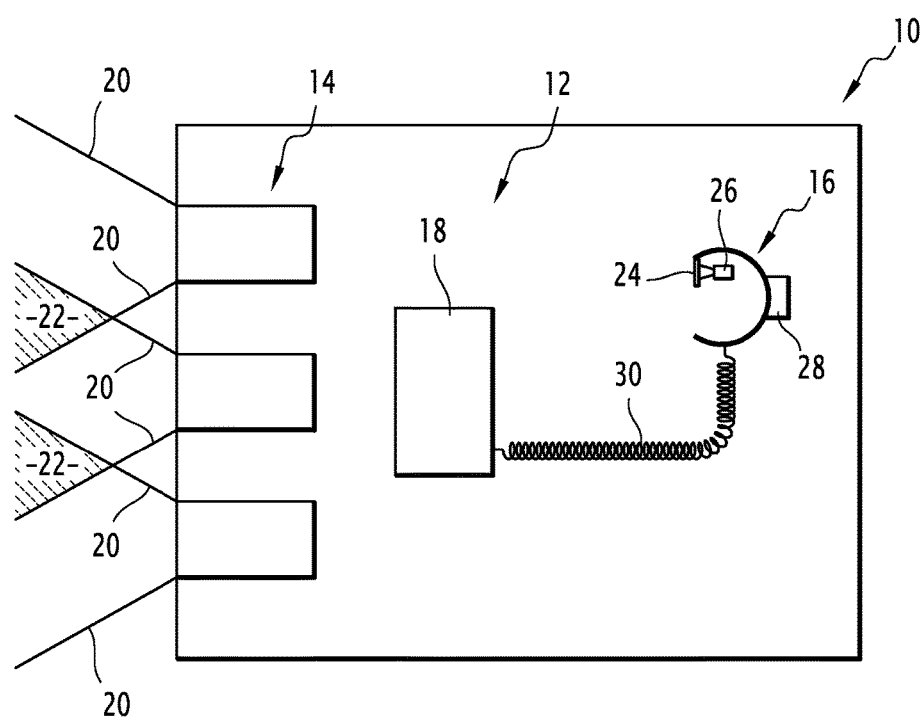

(51) Int. Cl.
    *G06F 3/01*    (2006.01)
    *G01C 21/00*    (2006.01)
    *G06T 3/40*    (2006.01)

(52) U.S. Cl.
    CPC .... *G06T 3/4038* (2013.01); *G02B 2027/0138* (2013.01)

(56) References Cited

U.S. PATENT DOCUMENTS

| | | | | |
|---|---|---|---|---|
| 9,213,185 | B1* | 12/2015 | Starner | G02B 27/017 |
| 9,690,099 | B2* | 6/2017 | Bar-Zeev | G02B 27/017 |
| 2005/0007386 | A1 | 1/2005 | Berson et al. | |
| 2006/0066730 | A1* | 3/2006 | Evans, Jr. | H04N 5/2259 |
| | | | | 348/218.1 |
| 2011/0291918 | A1 | 12/2011 | Surber et al. | |

OTHER PUBLICATIONS

Kijima et al. ("A development of reflex HMD—HMD with time delay compensation capability." Proc. 2nd Int'l Symp. Mixed Reality. 2001) (Year: 2001).*

Kijima, "A Development of Reflex HMD—HMD With Time Delay Compensation Capability-", Proceedings of the International Symposium on Mixed Reality, 2001, pp. 40-47.

Kijima et al., "Reflex HMD to Compensate Lag and Correction of Derivative Deformation", Proceedings IEEE 2002 Virtual Reality, Mar. 24, 2002, pp. 172-179.

Regan et al., "Priority Rendering with a Virtual Reality address Recalculation Pipeline", Computer Graphics Proceedings—Annual Conference Series, Jul. 24, 1994, pp. 155-162.

Ashikhmin, "A Tone Mapping Algorithm for High Contrast Images", Thirteenth Eurographics Workshop on Rendering, 2002, pp. 145-155.

* cited by examiner

METHOD OF DISPLAY AND SYSTEM FOR AIDING NAVIGATION

CROSS-REFERENCE TO RELATED APPLICATION

This application is a U.S. National Phase application of PCT/EP2013/076042, filed on Dec. 10, 2013, which claims the benefit of French Application No. 12 03441, filed Dec. 17, 2012, both of which are incorporated herein by reference in their entireties.

The present invention relates to a method of display. The invention also relates to a system for aiding navigation and a vehicle including the system for aiding navigation.

The field of interest is the domain of aid for navigation of an aerial vehicle or ground vehicle, and more specifically, that of enhancing the perception of the external environment of the vehicle.

Operators of an aerial or land vehicle, such as the pilot, are required to take into account the external environment of the vehicle in their various different tasks. By way of example, the actual trajectory path effectively selected for an aerial vehicle is a function of the environment of the vehicle.

In order to obtain a good perception of the environment of the vehicle, the operator is often equipped with an augmented reality headset. Such a headset enables the operator to simultaneously view on a single semi-transparent screen a part of the environment with direct vision and projected images of the same part of the environment acquired by a detection device.

By way of example, the detection device comprises a plurality of cameras operating in the infrared spectrum. In this case, the operator views the concerned part of the environment both in the visible band (direct view) and in an infrared band (via the detection device). The operator thus has available more information and data about the environment of the vehicle than is possible through simple direct vision.

However, on account of the time period needed for processing of the images, there exists a delay between the time instant when the images are acquired by the detection device and the time instant wherein the images are projected to the operator for viewing. This delay is referred to as "latency time" in the following sections of the description.

Latency time for the operator is translated into a content related latency time and a position related latency time.

By way of example, the content related latency time becomes manifest in the observation of a car moving forward in the environment from the rear to the front while the pilot or driver and the vehicle remain stationary. The vehicle observed by direct vision will be ahead in relation to the vehicle projected. In order for this disconnect between the image seen by the operator in direct vision and the projected image to be tolerable for the operator, it is necessary to limit the content related latency time to 80 milliseconds (ms).

The position related latency time becomes manifest particularly when the vehicle is stationary with an environment without mobile elements and the pilot moves his/her head. There is a mismatch between the orientation of the pilot at the moment of the projection of the image on the screen of the headset and line of sight of the cameras at the moment of acquisition of the images by the cameras. Thus, the image projected and the image viewed in direct vision overlap without being superposed, although the environment remains unchanged between the time instant of acquisition of the images and the time instant of projection of the images on the screen of the headset. In the event of continuous movement of the headset of the operator, a phenomenon of dragging occurs. For this reason, it is therefore necessary to limit the position related latency time to 20 ms.

It is therefore desirable to reduce to the greatest degree possible the latency time, and in particular the position related latency time.

In order to do this, a technology known from the document U.S. Pat. No. 7,148,861 involves an image processing unit that displays enhanced vision images on the basis of a plurality of image sources. The image processing unit includes a series processing unit and a parallel processing unit.

The series processing unit performs the low volume data calculations required by the parallel processing unit for the displaying of an image. The series processing unit precalculates the transformations required to convert the data originating from each source to a system of principal coordinates.

The parallel processing unit uses the transformations and correlates the data derived from each source with a pixel by pixel display, in a manner so as to provide display data with reduced latency.

But the operational implementation of the processing unit as per the document U.S. Pat. No. 7,148,861 is complex.

It is also a known technique to carry out a predictive filtering on the operator's movements in order to obtain a predicted orientation of the operator and to display the image acquired by the detection device as a function of the predicted orientation.

However, the development of filters to be used for the predictive filtering proves to be difficult, in particular because the movements of the head of the operators are abrupt and difficult to predict.

There is therefore a need for a display method for displaying an image on a screen of a headset of a system for aiding navigation which provides for easy operational implementation and that makes it possible to reduce the latency time.

To this end, the invention provides a display method for displaying an image on a screen of a headset of a system for aiding navigation. The system for aiding navigation comprises of the headset and a calculator. The display method comprises the successive steps of measurement of the orientation of the headset of the operator furnished with the headset; of processing of a first image having a first number of pixels so as to obtain a first processed image; of extraction of a part of the first processed image as a function of the measured orientation of the headset so as to obtain a second image, the second image having a second number of pixels strictly lower than the first number of pixels; and of dispatching by the calculator to the headset of the second image for display on the screen.

According to preferred embodiments of the invention, the method comprises one or more of the following characteristic features, taken into consideration in isolation or in accordance with any technically possible combination(s):

During the step of extraction, the orientation of the headset measured is the centre of the second image.

The ratio between the first number of pixels and the second number of pixels is selected based on an increase in the amplitude of movements of the headset of the operator over the duration of the step of image processing.

The ratio between the first number of pixels and the second number of pixels is less than 150%, preferably less than 130%.

The first image has a first size along a first direction and a second size along a second direction that is perpendicular to the first direction, the second image has a third size along the first direction and a fourth size along the second direction, with the ratio between the first size and the third size being equal to the ratio between the second size and the fourth size.

The system for aiding navigation comprises in addition, a plurality of cameras capable of acquiring at least one image of a part of an environment.

The method includes in addition, the steps of receiving by the calculator of images of a part of the environment acquired by the plurality of cameras; of merging of the images derived from the plurality of cameras so as to obtain a merged image of the part of the environment; of extraction of a part of the merged image so as to obtain the first image; of determining of the orientation of the headset of the operator prior to the step of extraction of the part of the merged image, the extraction of the part of the merged image being a function of the orientation of the headset determined in the step of determination.

During the extraction step, the orientation of the headset determined is the centre of the first image.

The invention also relates to an image display method for displaying images on the respective screens of at least two headsets of a system for aiding navigation. The system for aiding navigation includes at least two headsets, a plurality of cameras capable of acquiring at least one image of a part of an environment and a calculator. The method comprises, for each screen, the steps of the method as previously described above.

The invention also relates to a system for aiding navigation for a vehicle comprising a calculator and at least one headset, the calculator being capable of ensuring the operational implementation of the method as previously described above.

The invention also relates to a vehicle including a system for aiding navigation as previously described above.

Figure 2:
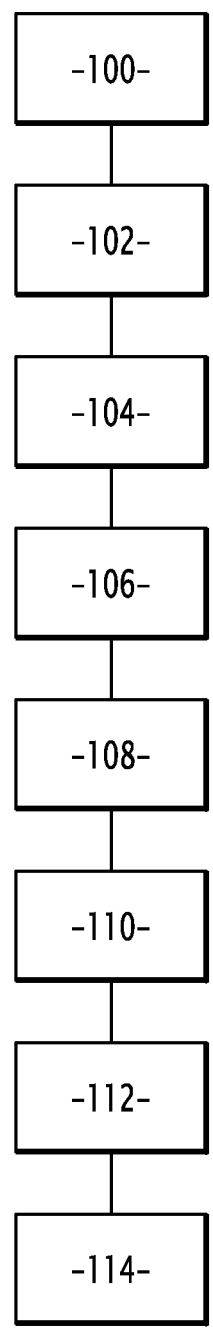

Other characteristic features and advantages of the invention will become apparent upon reading the detailed description of the embodiments of the invention that follow here below, provided primarily by way of example only and with reference being made to the drawings as follows:

FIG. 1, is a schematic view of an example of a vehicle fitted with the system for aiding navigation according to the invention, and FIG. 2 is a flowchart of an example of the method according to the invention.

The vehicle 10 represented in FIG. 1 is an aerial vehicle or a land vehicle. By way of example, the vehicle 10 is a helicopter.

The vehicle 10 includes a navigation aid system 12 for aiding navigation.

The system 12 for aiding navigation includes a plurality of cameras 14, a headset 16, and a calculator 18.

In the example provided, the system 12 for aiding navigation comprises three cameras 14.

The three cameras 14 are arranged on a part of the vehicle 10 in a manner such that the cameras 14 are capable of acquiring images of the environment of the vehicle 10. For example, the cameras 14 are part of the body shell of the vehicle 10.

The fields of observation of the cameras 14 determine the parts of the environment in which the cameras 14 are capable of acquiring images. The fields of observation are delimited in FIG. 1 by the solid lines 20.

The fields of the cameras 14 thus overlap as is indicated by the zones 22 of overlap clearly highlighted by the shading with dashed lines. This makes it possible to prevent the existence of angular zones that are not observed in the proximity of an operator of the vehicle.

According to the example, the cameras 14 are capable of detecting photons emitted by the environment in the infrared spectrum.

By way of a variant, the cameras 14 are capable of detecting photons emitted by the environment in the visible spectrum with a low level of light (for example at dusk). Such visible cameras 14 are sometimes referred to by the acronym "LLL" for the term "Low Light Level".

The headset 16 is intended for use by an operator of the vehicle 10.

The headset 16 has a screen 24, an image projector 26 and a gyroscope 28.

The image projector 26 is capable of projecting an image on to the screen 24.

The screen 24 is semi-transparent so as to allow the operator to simultaneously view the external environment of the vehicle 10 and an image projected by the projector 26. For this reason, the headset 16 is referred to as "augmented reality headset" 16.

The gyroscope 28 is capable of delivering information and data that make it possible to determine the orientation of the headset 16 in relation to a reference R by taking into account the movements of the vehicle provided by an inertial unit of the vehicle or by any other means. For example, the gyroscope 28 outputs the measures of angular derivatives along three axes of an inertial reference frame. By way of example, the reference point R is the orientation of the headset 16 in which the operator is looking straight ahead. The specific movement of the vehicle 10 is taken into account in order to bring back the orientation of the headset 16 calculated based on the information and data from the gyroscope 28 into an absolute reference frame in the vehicle reference frame. The orientation of the headset 16 of the operator is then identified by two angles relative to the reference point R.

The headset 16 is connected to calculator 18 by a cable 30.

The calculator 18 is capable of receiving the images acquired by the cameras 14, of processing the received images and then of bringing about the display thereof on the screen 24 of the headset 16 by the projector 26.

The calculator 18 is, for example, a graphics processor. A graphics processor, or GPU (the acronym as per English terminology for Graphics Processing Unit) is an integrated circuit present on a graphics card, and ensures performance in particular of the functions of calculation of the display.

By way of a variant, the calculator 18 is a programmable logic circuit. Such a circuit is an integrated logic circuit which is capable of being reprogrammed after its manufacture. For example, the calculator 18 is an FPGA circuit (the acronym as per English terminology for field programmable gate array) which is a set of logic gates that are programmable in situ.

The operation of the system 12 for aiding navigation will now be described.

The cameras 14 simultaneously acquire three images of the exterior environment outside the vehicle 10. The three images are transmitted to the calculator 18.

The calculator 18 then operationally implements an image display method for displaying an image on the screen 24 of the headset 16 with reference to the flowchart shown in FIG. 2.

The method comprises a reception step 100 for receiving by the calculator 18 of images of the relevant environment part acquired by the three cameras 14.

The method also comprises a determination step 102 for determining the orientation of the headset 16 relative to the reference point R.

The step 102 is carried out by means of a measurement with the gyroscope 28.

By way of a variant, the orientation of the headset 16 determined is an orientation predicted by making use of a process of predictive filtering on the movements of the operator.

The method then includes a step 104 of merging of the images received during the receiving step 100 so as to obtain a merged image IF of the environment.

During the merging, account is taken in particular of the fact that the zones 22 of overlap are imaged by multiple cameras 14.

For example, for a pixel in a zone 22 of overlap imaged by two cameras 14, the step of merging includes a calculation of the value of the pixel by way of calculation of a linear combination of the value of the pixel for one of the two cameras 14 and of the value of the same pixel for the other camera 14.

According to one variant, the coefficients of the linear combination depend on the distance of the pixel of interest to the pixels located at the periphery of the images to be merged.

The step 104 of merging thus provides the ability to obtain the merged image IF which is a panoramic image of the environment. The merged image IF associates with a point in the field of observation of the operator a pixel value. The coordinates of this point may be expressed in several reference frames. In particular, the coordinates of this point may be possibly referenced in the same reference frame system that provides for referencing/identification of the orientation of the operator.

According to one variant, only the images to be used for the development of the final image are merged. For example, if the operator looks to the left of the vehicle, the images acquired by the cameras on the right are not merged; only the images acquired by the cameras on the left and in the centre are used for the merging.

The method also includes a first step 106 of extracting of a part of the merged image IF so as to obtain a first image 11.

The first image 11 has a first number of pixels N1.

The first frame 11 has a first size T1 along a first direction of the image and a second T2 size along a second direction of the image that is perpendicular to the first direction of the image.

By way of example, the first size T1 is 1200 pixels and the second size T2 is 1000 pixels. The first number N1 of pixels is then 1200×1000 pixels.

According to the example shown, the first step 106 of extraction of the part of the merged image IF is based on the orientation of the headset 16 determined in the step 102 of determination.

By way of illustration, the orientation of the headset 16 determined in the determining step 102 is the centre of the first image 11.

Thus, in this case, for a given first size T1 and a given second size T2, the first step 106 of extraction is carried out in two stages. It is first determined as to which pixel of the merged image IF corresponds to the orientation of the headset 16 determined in the determination step 102. In a second stage a rectangle of sizes T1 and T2 around this pixel is extracted. The pixels that belong within this rectangle form the first image 11.

The method also includes a step 108 of processing of the first image 11 so as to obtain a first processed image IT1.

The step 108 of image processing is aimed at improving the quality of the first image 11.

By way of illustration, according to one embodiment, the processing includes the implementation of a treatment of the brightness of the first image known as "tone mapping". Such a treatment process is used to generate an image in which all of the elements of the image are correctly and properly exposed. The absence of overexposure and underexposure makes possible the effective viewing of the image both in dark zones as well in bright or light zones.

The processed image IT1 has the same number of pixels as the first image 11.

The method also includes a measuring step 110 for measuring the orientation of the headset 16 after the step 108 of processing of the first image 11.

This measurement is, for example, carried out with the gyroscope 28 of the headset 16.

According to one variant, the movement of the vehicle between the time instants of carrying out the steps 102 and 110 of measurement is also taken into account.

The movement of the vehicle is, for example, obtained by making use of an inertial measurement unit.

In this case, the orientation of the headset has been modified by a value δ given by:

$$\delta = \alpha_2 - \alpha_1 + \beta$$

where
 $\alpha_1$ is the orientation of the headset at the time instant of implementation of the step 102 of measurement,
 $\alpha_2$ is the orientation of the headset at the time instant of implementation of the step 110 of measurement,
 β is the movement of the vehicle between the two time instants.

The method also includes a second step 112 of extracting of a part of the first processed image IT1 based on the orientation measured during the step 110 of measuring so as to obtain a second image 12.

For example, according to one embodiment that is similar to the first step 106 of extraction previously described above, the measured orientation is the centre of the second image 12.

The second image 12 has a second number of pixels N2.

For example, the second number of pixels N2 is fixed by the size of the image that can possibly be displayed on the screen 24 due to the fact that the dimensions of the screen 24 are finite.

By way of example, the second number of pixels N2 is 1024×768 pixels.

The second number of pixels N2 is strictly lower than the first number of pixels N1.

The ratio between the first number of pixels N1 and the second number of pixels N2 is chosen on the basis of an increase in the amplitude of movements of the headset 16 of the operator over the duration of the steps 104, 106 and 108 of processing.

Suppose the operator makes sudden movements over the entire duration of the step 108 of processing. His head then moves at the maximum rate of 150 degrees per second (°/s).

The duration of the steps 104, 106 and 108 of processing is limited. Typically, the duration of the processing step is 30 ms.

This implies that the possible orientations for the headset of the operator are limited. The operator in particular does not have the time to completely turn their head. In the example presented, at most, the orientation of the headset 16 of the operator is modified by 4.5°. 4.5° is an increase in the amplitude of movements of the headset 16 of the operator over the duration of the steps 104, 106 and 108 of processing.

An increase in the amplitude of movements of the headset 16 of the operator over the duration of the processing step 108 therefore provides the ability to obtain a set of possible orientations for the headset of the operator.

For each possible orientation (between 0 and 4.5° in the example), a central pixel in the merged image IF can possibly be determined. Assuming that the operator's field of view is fixed, that is to say that the number of pixels N2 is fixed, for each central pixel determined by correspondence with a possible orientation, a set of N2 pixels is also determined. In other words, associated with each possible orientation, are N2 pixels around the determined central pixel.

The pixels that belong to the different sets of N2 pixels for different possible orientations are the pixels of the first image I1.

An increase in the amplitude of movements of the headset 16 of the operator over the duration of the steps 104, 106 and 108 of processing and the value of the angular field seen by each pixel therefore make it possible to determine the number of pixels N1 of the first image and the number of pixels N2 of the second image, and hence the ratio thereof.

According to another variant, the ratio between the first number of pixels N1 and the second number of pixels N2 is less than 160%.

In the example presented, the ratio between the first number of pixels N1 and the second number of pixels N2 is 152%.

Preferably, the ratio between the first number of pixels N1 and the second number of pixels N2 is less than 130%.

Moreover, according to the example shown, the second image 12 has a third size T3 along the first direction of the image and a fourth size T4 along the second direction of the image.

The ratio between the first size T1 and the third size T3 is equal to the ratio between the second size T2 and the fourth size T4.

This signifies that the same factor of reduction is applied in both the dimensions.

The method then includes a step 114 of dispatching of the data relative to the second image 12 from the calculator 18 to the headset 16.

The projector 16 then displays the second image on the screen 24.

The operator then views simultaneously on the display screen 24 a part of the environment in direct vision and the projected images of the same part of the environment acquired by the cameras 14.

The display method includes two extractions. Indeed, the first step 106 of extraction is a step of "crude extraction" while the second step 112 of extraction is a step of "fine extraction".

Thus the step 108 of processing is carried out on a part of the merged image IF only. This makes it possible to limit the duration of the step 108 of processing.

In addition, the step 114 of dispatching of data and the step 110 of measurement of the orientation of the headset 16 of the operator are synchronised since the duration of the second extraction step 112 is very short.

In addition, the second image 12 displayed takes into account a measured orientation of the headset 16 and not a predicted orientation. Due to this fact, the position of the second image 12 is more precise than that obtained in the state of the art.

As a consequence thereof, the method makes it possible to greatly reduce the position related latency of the image displayed to the operator.

In addition, the method is easy to implement.

By way of a variant, the system 12 for aiding navigation is suitable for a plurality of operators. By way of example, the pilot and co-pilot are required to work at the same time in order to observe the same environment, with each observing a different part of the environment.

In this case, the step 106 of first extraction, the step 108 of processing, the step 110 of measurement, the step 112 of second extraction, and the step 114 of dispatching of data, are carried out simultaneously for the different operators using the system 12 for aiding navigation.

The invention claimed is:

1. A method for displaying an image on a screen of a headset of a system for aiding navigation, wherein the system further comprises a calculator and a plurality of cameras capable of acquiring at least one image of a part of an environment, the method comprising the successive steps of:
   receiving by the calculator images of the part of the environment acquired by the plurality of cameras;
   merging the images derived from the plurality of cameras to obtain a merged image of the part of the environment;
   determining a first orientation of the headset worn by an operator, the determination of the first orientation of the headset of the operator taking place at a first instant prior to extracting a part of the merged image;
   extracting the part of the merged image to obtain a first image, wherein the extracting the part of the merged image is a function of the determined first orientation of the headset of the operator;
   processing the first image having a first number of pixels to obtain a first processed image, the first processed image being an improved quality of the first image;
   measuring a second orientation of the headset worn by the operator, the measurement taking place at a second instant after the processing of the first image;
   extracting a part of the first processed image as a function of the second measured orientation of the headset to obtain a second image having a second number of pixels that is less than the first number of pixels; and
   dispatching by the calculator to the headset the second image for display on the screen.

2. The method according to claim 1, wherein during the step of extracting, the orientation of the headset measured is the center of the second image.

3. The method according to claim 1, wherein a ratio between the first number of pixels and the second number of pixels is selected based on an increase in the amplitude of movements of the headset of the operator over a duration of the step of image processing.

4. The method according to claim 1, wherein the ratio between the first number of pixels and the second number of pixels is less than 150%.

5. The method according to claim 1, wherein:
   the first image has a first size along a first direction and a second size along a second direction that is perpendicular to the first direction;

the second image has a third size along the first direction and a fourth size along the second direction;

with the ratio between the first size and the third size being equal to the ratio between the second size and the fourth size.

6. The method according to claim 1, wherein during the step of extracting the part of the merged image to obtain the first image, the determined orientation of the headset of the operator is the center of the first image.

7. A method for displaying images on respective screens of at least two headsets of a system for aiding navigation, wherein the system further comprises a plurality of cameras capable of acquiring at least one image of a part of an environment and a calculator, the method comprising, for each screen, the successive steps of:

receiving by the calculator images of the part of the environment acquired by the plurality of cameras;

merging the images derived from the plurality of cameras to obtain a merged image of the part of the environment;

determining a first orientation of the headset worn by an operator, the determination of the first orientation of the headset of the operator taking place at a first instant prior to extracting a part of the merged image;

extracting the part of the merged image to obtain a first image, wherein the extracting the part of the merged image is a function of the determined first orientation of the headset of the operator;

processing the first image having a first number of pixels to obtain a first processed image, the first processed image being an improved quality of the first image;

measuring a second orientation of the headset worn by the operator, the measurement taking place at a second instant after processing of the first image;

extracting a part of the first processed image as a function of the second measured orientation of the headset to obtain a second image having a second number of pixels that is less than the first number of pixels; and dispatching by the calculator to the headset the second image for display on the screen.

8. A navigation aid system for aiding navigation for a vehicle comprising:

at least one headset comprising a screen;

a plurality of cameras capable of acquiring at least one image of a part of an environment; and a calculator;

wherein the calculator is configured to do the following for each headset furnished to an operator during said aiding of the navigation of the vehicle:

receive images of the part of the environment acquired by the plurality of cameras;

merge the images derived from the plurality of cameras to obtain a merged image of the part of the environment;

determine a first orientation of the headset worn by the operator, the determination of the first orientation of the headset of the operator taking place at a first instant prior to extracting a part of the merged image;

extract the part of the merged image to obtain a first image, wherein extracting the part of the merged image is a function of the determined first orientation of the headset of the operator;

process the first image having a first number of pixels to obtain a first processed image, the first processed image being an improved quality of the first image;

measure a second orientation of the headset worn by the operator, the measurement taking place at a second instant after the processing of the first image;

extract a part of the first processed image as a function of the second measured orientation of the headset to obtain a second image having a second number of pixels that is less than the first number of pixels; and dispatch to the headset the second image for display on the screen.

9. A vehicle comprising a navigation aid system for aiding navigation of the vehicle, wherein the system comprises:

at least one headset comprising a screen;

a plurality of cameras capable of acquiring at least one image of a part of an environment; and a calculator;

wherein the calculator is configured to do the following for each headset furnished to an operator during said aiding of the navigation of the vehicle:

receive images of the part of the environment acquired by the plurality of cameras;

merge the images derived from the plurality of cameras to obtain a merged image of the part of the environment;

determine a first orientation of the headset worn by the operator, the determination of the first orientation of the headset of the operator taking place at a first instant prior to extracting a part of the merged image;

extract the part of the merged image to obtain a first image, wherein extracting the part of the merged image is a function of the determined first orientation of the headset of the operator;

process the first image having a first number of pixels to obtain a first processed image, the first processed image being an improved quality of the first image;

measure a second orientation of the headset worn by the operator, the measurement taking place at a second instant after the processing of the first image;

extract a part of the first processed image as a function of the measured orientation of the headset to obtain a second image having a second number of pixels that is less than the first number of pixels; and dispatch to the headset the second image for display on the screen.

* * * * *